United States Patent
Postetter et al.

(10) Patent No.: US 11,011,836 B2
(45) Date of Patent: May 18, 2021

(54) ADJACENT ANTENNA INTERFERENCE MITIGATION

(71) Applicant: The Boeing Company, Chicago, IL (US)

(72) Inventors: Jeffrey D. Postetter, Seattle, WA (US); William Preston Geren, Shoreline, WA (US); Hwai-Kee Tsiang, Edmonds, WA (US); Timothy Allen Murphy, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 601 days.

(21) Appl. No.: 15/384,954

(22) Filed: Dec. 20, 2016

(65) Prior Publication Data

US 2018/0175496 A1 Jun. 21, 2018

(51) Int. Cl.
*H01Q 1/52* (2006.01)
*H01Q 21/06* (2006.01)
(Continued)

(52) U.S. Cl.
CPC ........... *H01Q 1/523* (2013.01); *H01Q 3/2629* (2013.01); *H01Q 21/065* (2013.01); *H04B 1/126* (2013.01)

(58) Field of Classification Search
CPC ...... H01Q 1/521; H01Q 1/523; H01Q 3/2629; H04B 1/126
See application file for complete search history.

(56) References Cited

U.S. PATENT DOCUMENTS 9,252,868 B1 * 2/2016 Bull .................... H04B 7/18519
9,997,831 B2 * 6/2018 Stratis .................... F41G 7/2246
(Continued)

FOREIGN PATENT DOCUMENTS

WO 2016089464 A1 6/2016

OTHER PUBLICATIONS

Wikipedia; "Microstrip antenna," downloaded from the Internet Oct. 3, 2016, 3 pages; <https://en.wikipedia.org/wiki/Microstrip_antenna.
(Continued)

*Primary Examiner* — Graham P Smith
*Assistant Examiner* — Amal Patel
(74) *Attorney, Agent, or Firm* — Sage Patent Group (57) ABSTRACT

A system for mitigating radio frequency interference includes a multiple patch antenna array including a multiplicity of patch antenna elements. The multiple patch antenna array is positioned relative to an interfering antenna such that signals from the interfering antenna cause interference with the multiple patch antenna array. The system also includes an auxiliary antenna positioned relative to the multiple patch antenna array. The system additionally includes a device to generate a spatial null in a direction to the interfering antenna from the multiple patch antenna array in response to a first signal from the auxiliary antenna and a second signal from the multiple patch antenna array. The first signal and the second signal are generated in response to a transmitted signal being received by the auxiliary antenna and the multiple patch antenna array. The spatial null permits simultaneous operation of the multiple patch antenna array and the interfering antenna.

24 Claims, 8 Drawing Sheets

(51) Int. Cl.
*H04B 1/12* (2006.01)
*H01Q 3/26* (2006.01)

(56) References Cited

U.S. PATENT DOCUMENTS

| | | | |
|---|---|---|---|
| 2008/0143618 A1* | 6/2008 | Francque | H01Q 1/523 343/705 |
| 2011/0148706 A1* | 6/2011 | Eom | H01Q 3/2629 342/372 |
| 2016/0276734 A1 | 9/2016 | Jin et al. | |
| 2017/0301991 A1 | 10/2017 | Stratis et al. | |
| 2017/0353864 A1* | 12/2017 | Bull | H04W 16/04 |

OTHER PUBLICATIONS

Wikipedia; "Patch antenna," downloaded from the Internet Oct. 3, 2016, 1 page; <https://wn.wikipedia.org/wiki/Patch_antenna>.
European Patent Office; Extended European Search Report for European Patent Application No. 17196257.4 dated Apr. 25, 2018, 10 Pages.
Chinese First Notification of Office Action dated Jun. 9, 2020 for Chinese Patent Application No. 201711097849.5, 11 pages including English translation.
Chinese Second Office Action dated Nov. 11, 2020 for Chinese Patent Application No. 201711097849.5, 12 pages (including English translation).

* cited by examiner

ADJACENT ANTENNA INTERFERENCE MITIGATION

FIELD

The present disclosure relates to antennas and more particularly adjacent antenna interference mitigation.

BACKGROUND

Interference issues may make simultaneous operation of a satellite transceiver or system and a communications system onboard an aircraft difficult if not impossible under some circumstances. When two communications systems have spectrum allocations that are directly adjacent one another and there is no guard band between the operating frequency spectrums of the two systems, operation of one system can interfere with operation of the other. There are three possible interference mechanisms that should be considered. First, there is spurious harmonic and out of band transmission. Secondly, very high power signals may overload a front end of a receiver and block reception of the desired signals. Finally, some systems may operate on multiple carriers. These multiple carriers can produce intermodulation products that will fall directly in the relevant band producing interference to signal reception. Because there is no guard band between the operating frequencies of the systems and some of the interference mechanisms involve significant unwanted signals, classical frequency filtering approaches are inadequate and interference has sometimes been unavoidable. Hence the only means to deal with the interference has been to ensure that the systems are not used at the same time. Such a solution is unacceptable and there is a need for both systems to be able to operate simultaneously.

SUMMARY

In accordance with an embodiment, a system for mitigating radio frequency (RF) interference from an adjacent antenna includes a multiple patch antenna array including a multiplicity of patch antenna elements. The multiple patch antenna array is positioned relative to an interfering antenna such that RF transmission signals from the interfering antenna cause interference with receiving RF signals by the multiple patch antenna array. The system also includes an auxiliary antenna positioned relative to the multiple patch antenna array. The system additionally includes a device to generate a spatial null in a direction to the interfering antenna from the multiple patch antenna array in response to a first signal from the auxiliary antenna and a second signal from the multiple patch antenna array. The first signal and the second signal are generated in response to a transmitted signal being received by the auxiliary antenna and the multiple patch antenna array. The spatial null permits simultaneous operation of the multiple patch antenna array and the interfering antenna.

In accordance with another embodiment, a system for mitigating RF interference from an adjacent antenna, includes a first transceiver onboard a vehicle. The first transceiver is configured for transmitting and receiving RF signals over a first communications system operating in a first frequency band. The system also includes an interfering antenna coupled to the first transceiver for transmitting and receiving the RF signals. The system additionally includes a second transceiver onboard the vehicle. The second transceiver is configured for transmitting and receiving RF signals over a second communications system operating in a second frequency band adjacent the first frequency band without a guard frequency between the first frequency band and the second frequency band. The system also includes a multiple patch antenna array coupled to the second transceiver. The multiple patch antenna array includes a multiplicity of patch antenna elements. The multiple patch antenna array is positioned proximate to the interfering antenna such that RF transmission signals from the interfering antenna cause interference with receiving the RF signals by the multiple patch antenna array. The system additionally includes an auxiliary antenna positioned between the multiple patch antenna array and the interfering antenna and proximate to the multiple patch antenna array. The system further includes a device to generate a spatial null in a direction to the interfering antenna from the multiple patch antenna array in response to a first signal from the auxiliary antenna and a second signal from the multiple patch antenna array. The first signal and the second signal are generated in response to a transmitted signal being received by the auxiliary antenna and the multiple patch antenna array. The spatial null permits simultaneous operation of the multiple patch antenna array and the interfering antenna.

In accordance with a further embodiment, a method for mitigating RF interference from an adjacent antenna includes receiving a first signal from an auxiliary antenna and receiving a second signal from a multiple patch antenna array. The multiple patch antenna array includes a multiplicity of patch antenna elements. The multiple patch antenna array is positioned relative to the interfering antenna such that RF transmission signals from the interfering antenna cause interference with receiving RF signals by the multiple patch antenna array. The method also includes generating a spatial null in a direction to the interfering antenna from the multiple patch antenna array in response to the first signal and the second signal. The first signal and the second signal are generated in response to a transmitted signal being received by the auxiliary antenna and the multiple patch antenna array. The spatial null permits simultaneous operation of the multiple patch antenna array and the interfering antenna.

In accordance with another embodiment or any of the previous embodiments, the method further includes determining an amplitude adjustment and a phase factor adjustment to provide cancellation of the RF transmission signals from the interfering antenna in the direction of the interfering antenna from the multiple patch antenna array. The method additionally includes applying the amplitude adjustment and the phase factor adjustment to the first signal from the auxiliary antenna to provide a cancellation signal that generates the spatial null in the direction of the interfering antenna from the multiple patch antenna array.

In accordance with another embodiment or any of the previous embodiments, the method further includes amplifying the first signal from the auxiliary antenna to a predetermined amplitude to cancel the RF transmission signals in the direction of the interfering antenna without decreasing an amplitude of an electromagnetic radiation pattern of the multiple patch antenna array in other directions from the multiple patch antenna array.

In accordance with another embodiment or any of the previous embodiments, the device to generate a spatial null in a direction to the interfering antenna from the multiple patch antenna array is configured to determine an amplitude adjustment and a phase factor adjustment to provide cancellation of the RF transmission signals from the interfering antenna in the direction of the interfering antenna from the multiple patch antenna array.

In accordance with another embodiment or any of the previous embodiments, the amplitude adjustment and the phase factor adjustment are applied to the first signal from the auxiliary antenna to provide a cancellation signal that generates the spatial null in the direction of the interfering antenna from the multiple patch antenna array.

In accordance with another embodiment or any of the previous embodiments, the first signal from the auxiliary antenna is amplified to a predetermined amplitude to cancel the RF transmission signals in the direction of the interfering antenna from the multiple patch antenna array without decreasing an amplitude of an electromagnetic radiation pattern of the multiple patch antenna array in other directions from the multiple patch antenna array.

In accordance with another embodiment or any of the previous embodiments, the auxiliary antenna includes a monopole antenna.

In accordance with another embodiment or any of the previous embodiments, the monopole antenna is positioned about one wavelength from a center of the multiple patch antenna array.

In accordance with another embodiment or any of the previous embodiments, wherein a height of the monopole antenna is selected so that a response of the monopole antenna to a radiated electromagnetic field from the interfering antenna approximately matches a response of the multiple patch antenna array to the radiated electromagnetic field of the interfering antenna.

In accordance with another embodiment or any of the previous embodiments, the multiple patch antenna array includes at least two patch antenna elements.

In accordance with another embodiment or any of the previous embodiments, the multiple patch antenna array includes four patch antenna elements.

In accordance with another embodiment or any of the previous embodiments, the patch antenna elements are positioned linearly to one another and the auxiliary antenna.

In accordance with another embodiment or any of the previous embodiments, each patch antenna element is square and the multiple patch antenna array provides circular polarization.

In accordance with another embodiment or any of the previous embodiments, the device to generate the spatial null includes a first band pass filter that receives the first signal from the auxiliary antenna and a summing junction to combine a signal from each of the patch antenna elements of the multiple patch antenna array to form the second signal. The device also includes a second band pass filter that receives the second signal from the multiple patch antenna array. The device additionally includes a local oscillator. A first output signal from the first band pass filter is mixed with a reference signal from the local oscillator to provide a first mixed signal and a second output signal from the second band pass filter is mixed with another reference signal from the local oscillator to provide a second mixed signal. The device additionally includes a first analog-to-digital converter (ADC) to digitize the first mixed signal and a second ADC to digitize the second mixed signal. The device further includes a digital signal processor that combines the digitized first mixed signal and the digitized second mixed signal to provide the spatial null in the direction of the interfering antenna from the multiple patch antenna array.

In accordance with another embodiment or any of the previous embodiments, the interfering antenna transmits the RF transmission signals in a first frequency band and the multiple patch antenna array transmits and receives other RF transmission signals in a second frequency band adjacent the first frequency band without a guard band between the first frequency band and the second frequency band.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
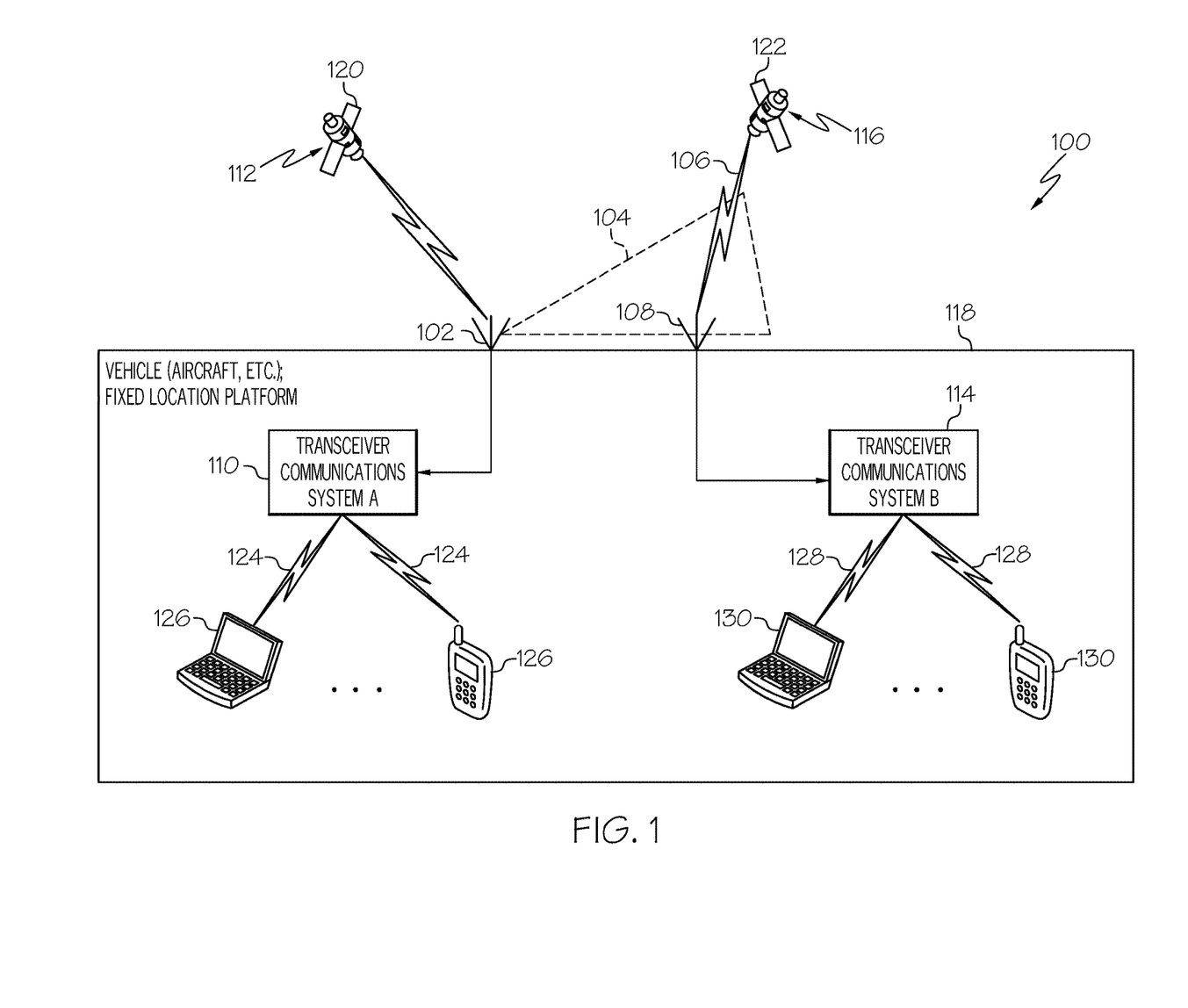
FIG. 1 is an illustration of an interfering antenna causing radio frequency (RF) interference with receiving RF signals by an adjacent victim antenna.

FIG. 1 is an example of a communications system 100 illustrating an interfering antenna 102 causing radio frequency (RF) interference 104 with receiving RF signals 106 by an adjacent victim antenna 108. The interfering antenna 102 is communicatively or electrically connected to a first transceiver 110 for communications over a first satellite communications system 112, system A, or first communications network using the interfering antenna 102. The adjacent victim antenna 108 is communicatively connected to a second transceiver 114 configured for communications over a second satellite communications system 116, system B, or second communications network. In accordance with an embodiment, the interfering antenna 102 and the adjacent victim antenna 108 are located proximate one another on a vehicle 118, for example, an aircraft. In other embodiments, the interfering antenna 102 and associated first transceiver 110 and the adjacent victim antenna 108 and associated second transceiver 114 are located on other types of vehicles, such as watercraft or terrestrial vehicles, or the interfering antenna 102 and adjacent victim antenna 108 and associated transceivers are located on a fixed geographic location platform.

In accordance with an embodiment, the first transceiver 110 may be an Inmarsat transceiver and the first satellite communications system 112 or network is the Inmarsat satellite communications system or network including a first constellation of satellites 120. The second transceiver 114 may be an Iridium transceiver and the second satellite communications system 116 or network is the Iridium satellite communications system or network that includes a second constellation of satellites 122. Transmission of signals by the Inmarsat transceiver or first transceiver 110 using interfering antenna 102 causes interference with RF signals that are simultaneously transmitted or received by the Iridium transceiver or second transceiver 114 using adjacent victim antenna 108. The Inmarsat transceiver or first transceiver 110 is also configured for transmitting and receiving RF signals 124 from a first set of communications devices 126. The Iridium transceiver or second transceiver 114 is also configured for transmitting and receiving RF signals 128 from a second set of communications devices 130. The first set of communications devices 126 are configured for communications using the Inmarsat satellite communications system. The second set of communications devices 130 are configured for communications using the Iridium satellite communications system. In other embodiments, the first set of communications devices 126 and the second set of communications devices 130 are configured to communicate using either the Inmarsat satellite communications system or the Iridium satellite communications system. Examples of the first set of communications devices 126 and the second set of communications devices 130 include but are not limited to mobile communications devices, such as mobile phones, smart phones and computer devices, and vehicle or aircraft communications devices that operate using at least one of the Inmarsat satellite communications system or the Iridium satellite communications system.

Figure 2:
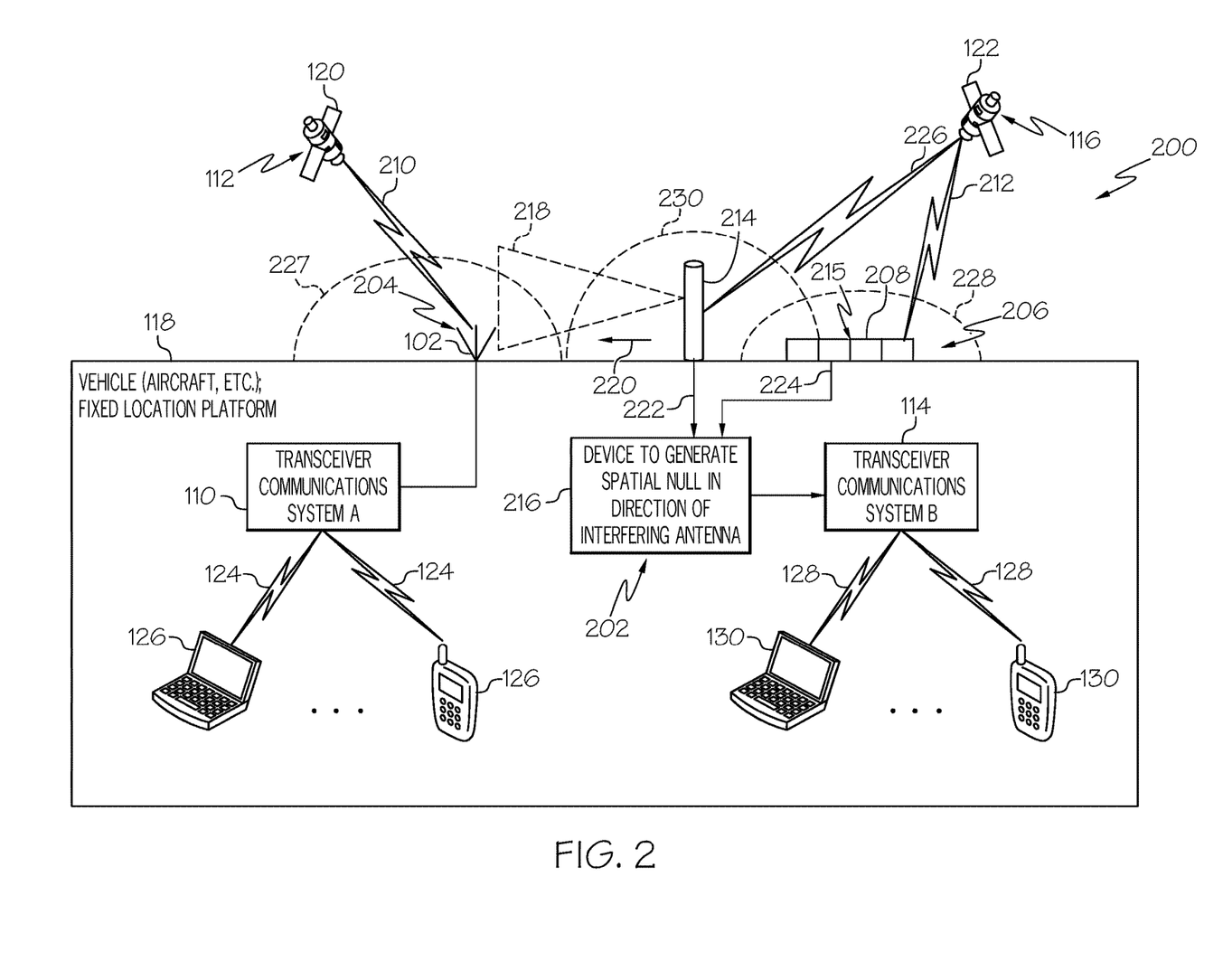
FIG. 2 is a block schematic diagram an example of a system for mitigating RF interference from an adjacent antenna in accordance with an embodiment of the present disclosure.

FIG. 2 is a block schematic diagram an example of a communications system 200 including a system 202 for mitigating RF interference from an adjacent antenna 204 in accordance with an embodiment of the present disclosure. The communications system 200 is similar to the communications system 100 in FIG. 1 except the communications system 200 includes the system 202 for mitigating RF interference from the adjacent antenna 204. The adjacent antenna 204 is the same as the interfering antenna 102. The system 202 includes a multiple patch antenna array 206 including a multiplicity of patch antenna elements 208. The multiple patch antenna array 206 is positioned relative to or proximate to the interfering antenna 102 or adjacent antenna 204 such that RF transmission signals 210 transmitted by the interfering antenna 102 cause RF interference 104 (FIG. 1) with receiving other RF signals 212 by the multiple patch antenna array 206. The interfering antenna 102 is communicatively or electrically connected to the first transceiver 110 for communications over the first satellite communications system 112, system A, or first communications network using the interfering antenna 102. The interfering antenna 102 transmits the RF transmission signals 210 in a first frequency band and the multiple patch antenna array 206 transmits and receives other RF signals 212 in a second frequency band adjacent the first frequency band without a guard band between the first frequency band and the second frequency band. An example of a multiple patch antenna array 504 that is used for the multiple patch antenna array 206 is described in more detail with reference to FIG. 5.

The system 202 also includes an auxiliary antenna 214 positioned relative to the multiple patch antenna array 206. In accordance with an embodiment, the auxiliary antenna 214 is a monopole antenna. The auxiliary antenna 214 or monopole antenna is positioned about one wavelength from a center 215 of the multiple patch antenna array 206 to prevent electromagnetic coupling between the auxiliary antenna 214 and the multiple patch antenna array 206. A height of the auxiliary antenna 214 or monopole antenna is selected so that a response of the auxiliary antenna 214 to radiated electromagnetic fields 227 or RF transmission signals 210 from the interfering antenna 102 approximately matches a response of the multiple patch antenna array 206 to the radiated electromagnetic fields 227 or RF transmission signals 210 from the interfering antenna 102. The auxiliary antenna 214 has a gain lower than a gain of the multiple patch antenna array 206 to prevent the auxiliary antenna 214 from affecting a radiation pattern or radiated electromagnetic field 228 of the multiple patch antenna array 206. The auxiliary antenna 214 may have a radiated electromagnetic field 230.

The communications system 200 additionally includes a device 216 to generate a spatial null 218 in a direction (represented by arrow 220) to the interfering antenna 102 from the multiple patch antenna array 206 in response to a first signal 222 from the auxiliary antenna 214 and a second signal 224 from the multiple patch antenna array 206. The device 216 to generate the spatial null 218 in the direction 220 of the interfering antenna 102 is electrically connected to the multiple patch antenna array 206 and the auxiliary antenna 214. An example of a device 701 that is used for the device 216 to generate the spatial null 218 will be described in more detail with reference to FIG. 7. The first signal 222 and the second signal 224 are generated in response to a transmitted RF signal 226 or radiated electromagnetic fields 227 being received by the auxiliary antenna 214 and the multiple patch antenna array 206. The second signal 224 also corresponds to the response of the multiple patch antenna array 206 to radiated electromagnetic fields 227 from the interfering antenna 102. In accordance with an embodiment the transmitted RF signal 226 is transmitted by the second satellite communications system 116. In other embodiments, the transmitted RF signal 226 is transmitted by the interfering antenna 102, the first satellite communications system 112 or another source.

As described in more detail with reference to FIGS. 4A and 4B, the spatial null is a void in an electromagnetic radiation pattern of the auxiliary antenna 214 and multiple patch antenna array 206 where the received or transmitted electromagnetic energy approaches about zero or is at a lowest decibel level such that no electromagnetic energy or an undetectable amount of electromagnetic energy or no detectable RF signals can be received in that particular direction. The spatial null 218 permits simultaneous operation of the multiple patch antenna array 206 and the interfering antenna 102. Accordingly, simultaneous communications are available with the first satellite communications system 112 or Inmarsat satellite communications system and the second satellite communications system 116 or Iridium satellite communications system. In accordance with an embodiment, the first satellite communication system operates in a frequency band that is adjacent a frequency band in which the second satellite communications system operates without a guard band or frequency spacing between the two adjacent frequency bands. Accordingly, simultaneous operation of the first satellite communications system with the second satellite communications system results in interference of the second satellite communications system by the first satellite communications system. Additionally, in accordance with an embodiment the first satellite communications system operates at a higher power than the second satellite communications system. In accordance with another embodiment, the system 202 is used for simultaneous communications with different communications systems that are terrestrial or ground based communications systems or one communications system is a satellite communications system and the other system is a ground based communications system wherein the system 202 mitigates RF interference from the interfering antenna 102 or adjacent antenna 204.

Figure 3:
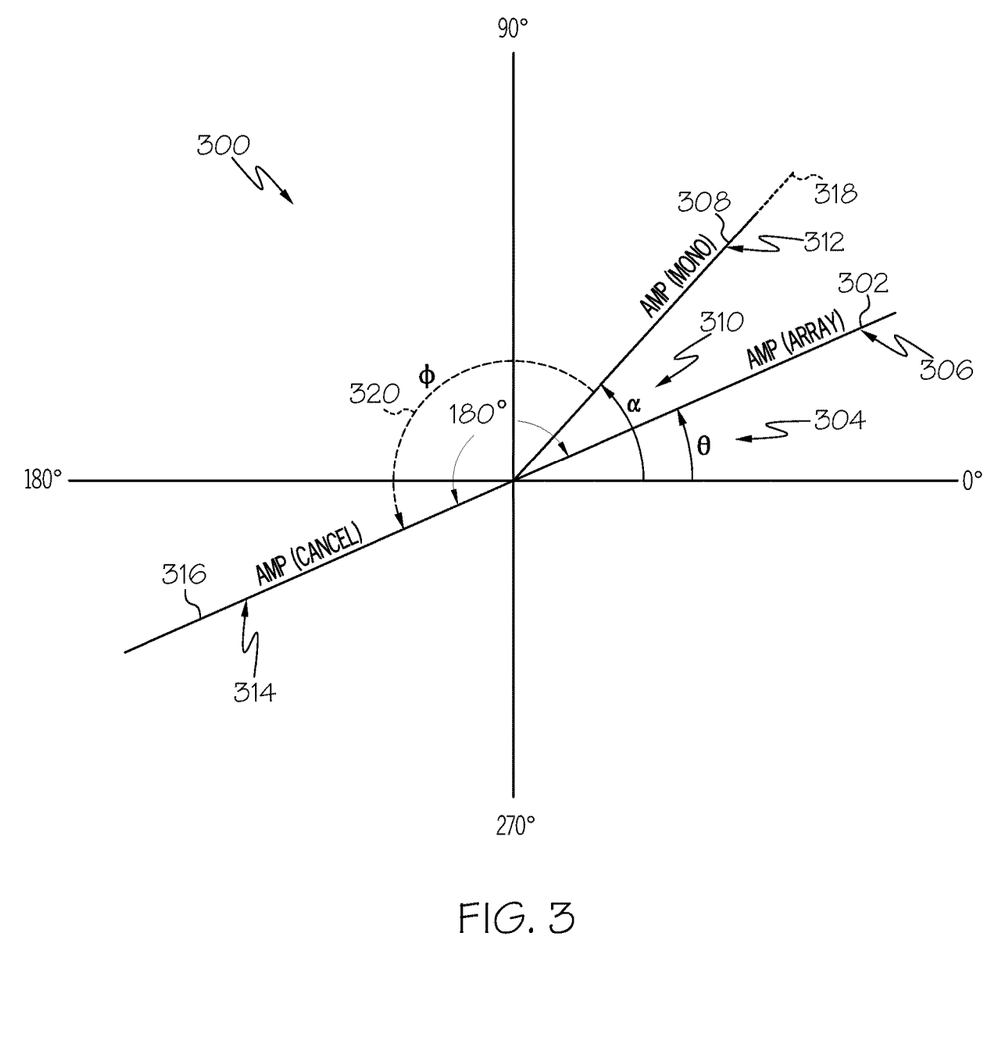
FIG. 3 is a polar coordinate system illustrating an example of determining a cancellation signal to generate a spatial null in a direction of the interfering antenna.

FIG. 3 illustrates a polar coordinate system 300 illustrating an example of determining a cancellation signal 314 to generate the spatial null 218 in the direction 220 of the interfering antenna 102 from the multiple patch antenna array 206. The device 216 is configured to determine an amplitude 302 and a phase factor θ (theta) 304 of a response of the multiple patch antenna array 206 to radiated electromagnetic fields 227 or RF transmission signals 210 from the interfering antenna 102 for generating the spatial null 218 by the device 216 in the direction 220 of the interfering antenna 102. The amplitude 302 and phase factor θ 304 are represented by the length or radius and angle of the vector 306 in the polar coordinate system 300. The amplitude 302 and the phase or phase factor θ 304 of a response of the multiple patch antenna array 206 to radiated electromagnetic fields 227 from the direction 220 of the interfering antenna 102 are used to provide cancellation of RF transmission signals 210 from the interfering antenna 102. The response of the multiple patch antenna array 206 to radiated electromagnetic fields 227 or RF transmission signals 210 from the interfering antenna 102 is also represented by the vector 306. The cancellation of RF transmission signals 210 from the interfering antenna 102 defines the spatial null 218 in the direction 220 to the interfering antenna 102 from the multiple patch antenna array 206.

The device 216 is also configured to determine an amplitude 308 and phase factor α (alpha) 310 of a response of the auxiliary antenna 214 or monopole antenna to radiated electromagnetic fields 227 from a direction 220 of the interfering antenna 102 from the auxiliary antenna 214 and multiple patch antenna array 206. The amplitude 308 and phase factor α 310 of the response of the auxiliary antenna 214 to radiated electromagnetic fields 227 or RF transmission signals 210 from the direction 220 of the interfering antenna 102 are represented by the length or radius of the vector 312 in the polar coordinate system 300. The response of the auxiliary antenna 214 or monopole antenna to radiated electromagnetic fields 227 or RF transmission signals 210 from the interfering antenna is also represented by the vector 312. A height of the auxiliary antenna 214 or monopole antenna is selected so that an amplitude 308 of the response of the auxiliary antenna 214 to radiated electromagnetic fields 227 or RF transmission signals 210 from the interfering antenna 102 approximately matches the amplitude 302 of the response of the multiple patch antenna array 206 to the radiated electromagnetic fields 227 or the RF transmission signals 210 from the direction 220 of the interfering antenna 102 from the multiple patch antenna array 206. A cancellation signal 314 (represented by the vector in FIG. 3) in the direction 220 of the interfering antenna 102 will have a phase factor that is 180 degrees out of phase with the phase factor θ 304 of the response of the multiple patch antenna array 206 to radiated electromagnetic fields 227 from the direction 220 of the interfering antenna 102 from the multiple patch antenna array 206. The cancellation signal 314 will also have an amplitude 316 represented by the length or radius of the cancellation signal 314 vector that cancels the amplitude 302 of the response of the multiple patch antenna array 206 to radiated electromagnetic fields 227 from the interfering antenna 102 from a cancellation angle or direction 220 to the interfering antenna 102. The amplitude 308 and phase factor α 310 of the auxiliary antenna 214 or monopole antenna are adjusted or corrected to provide the cancellation signal 314 that generates the spatial null 218 in the direction 220 from the multiple patch antenna array 206. Accordingly, the device 216 is configured to determine an amplitude adjustment 318 and a phase factor adjustment 1 (phi) 320 to provide the cancellation signal 314 that causes cancellation of the RF transmission signals 210 from the interfering antenna 102 in the direction 220 from the multiple patch antenna array 206 to the interfering antenna 102. The amplitude adjustment 318 and the phase factor adjustment Φ 320 are applied to the first signal 222 from the auxiliary antenna 214 represented by the vector 312 to provide the cancellation signal 314 that generates the spatial null 218 in the direction 220 from the multiple patch antenna array 206 to the interfering antenna 102.

Figure 4A:
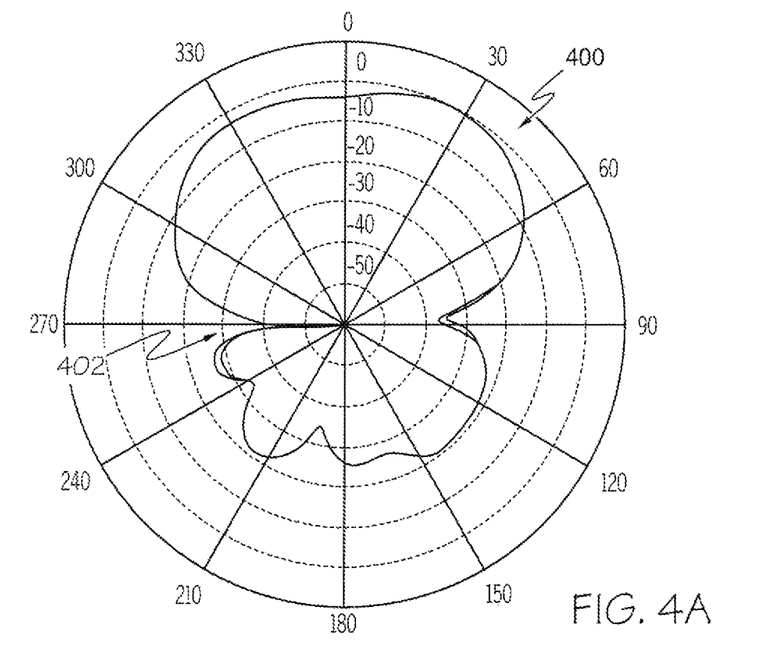
FIG. 4A is an exemplary radiation pattern about an elevation of the monopole antenna and multiple patch antenna array combination illustrating a spatial null in accordance with an embodiment of the present disclosure.
Figure 4B:
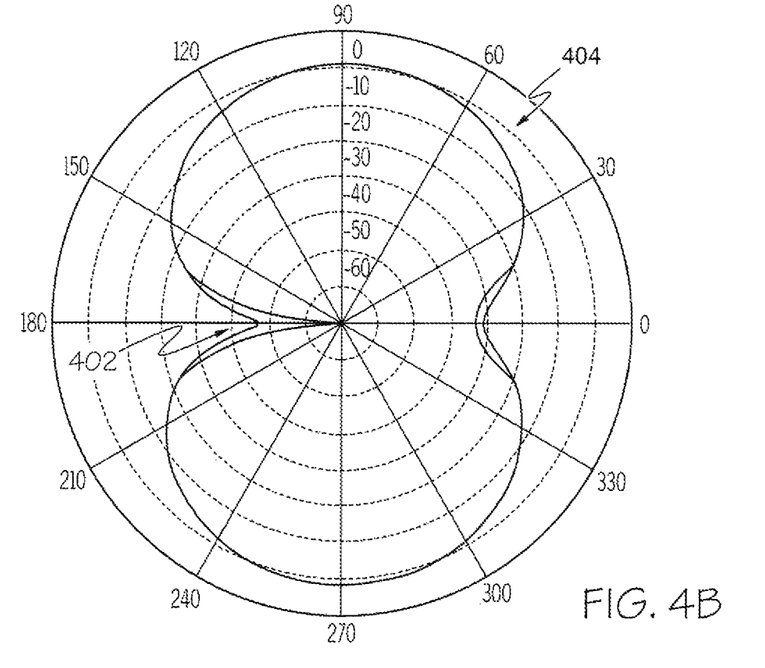
FIG. 4B is an exemplary radiation pattern about an azimuth of the monopole antenna and multiple patch antenna array combination illustrating a spatial null in accordance with an embodiment of the present disclosure.

FIG. 4A is an exemplary electromagnetic radiation pattern 400 about an elevation of the auxiliary antenna 214 and multiple patch antenna array 206 combination illustrating a spatial null 402 in accordance with an embodiment of the present disclosure. FIG. 4B is an exemplary electromagnetic radiation pattern 404 about an azimuth of the auxiliary antenna 214 and multiple patch antenna array 206 combination illustrating the spatial null 402 in accordance with an embodiment of the present disclosure. As previously described the spatial null 402 is in a direction 220 from the multiple patch antenna array 206 to the interfering antenna 102. The spatial null 402 is created based on the process described with reference to FIG. 3. Accordingly, RF transmission signals 210 from the interfering antenna 102 are cancelled in the direction of the spatial null 402 from the multiple patch antenna array 206. This allows the multiple patch antenna array 206 to receive or transmit RF signal in other directions about the electromagnetic radiation patterns 402 and 404 thus allowing simultaneous operation of the multiple patch antenna array 206 and the interfering antenna 102.

Figure 5:
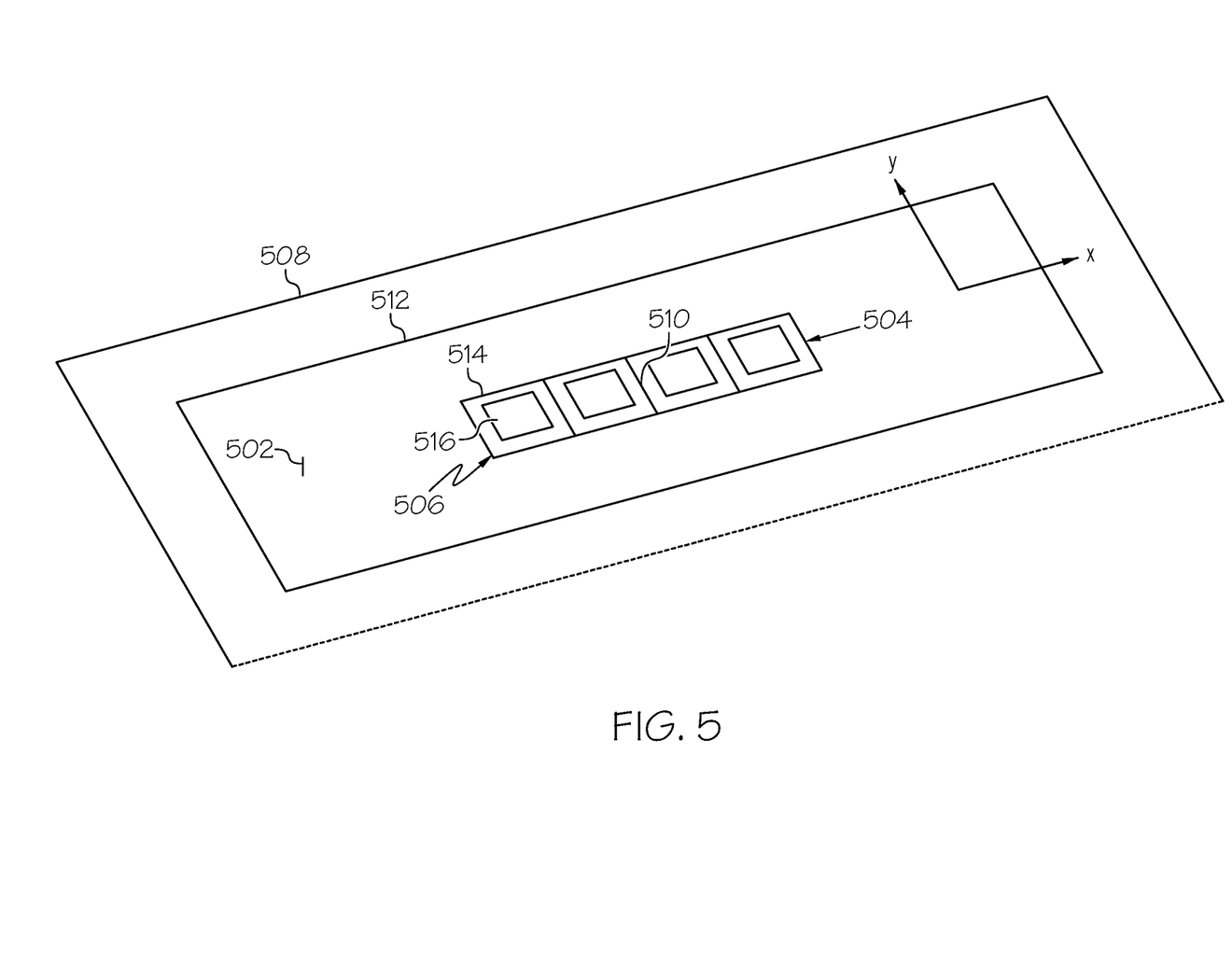
FIG. 5 is a perspective view of an example of a monopole antenna and multiple patch antenna array for mitigating RF interference from an adjacent antenna in accordance with an embodiment of the present disclosure.

FIG. 5 is a perspective view of an example of an auxiliary antenna 502 and a multiple patch antenna array 504 for mitigating RF interference from an adjacent antenna, such as adjacent antenna 204 or interfering antenna 102 in accordance with an embodiment of the present disclosure. In the example of FIG. 5, the auxiliary antenna 502 is a monopole antenna. In accordance with an embodiment, the auxiliary antenna 502 is used for the auxiliary antenna 214 and the multiple patch antenna array 504 is used for the multiple patch antenna array 206 in FIG. 2. In the exemplary embodiment in FIG. 5, the multiple patch antenna array 504 includes four patch antenna elements 506. In other embodiments, the multiple patch antenna array 504 includes at least two patch antenna elements 506 and in further embodiments the multiple patch antenna array 504 includes more than four patch antenna elements 506 depending upon gain requirements and a size of an area 508 for locating the multiple patch antenna array 504 and the auxiliary antenna 502, such as a panel or section of a fuselage of an aircraft.

In the exemplary embodiment in FIG. 5, the patch antenna elements 506 are positioned linearly to one another and the auxiliary antenna 502. In other embodiments, the patch antenna elements 506 are located in a planar array relative the auxiliary antenna 502 or the multiple patch antenna array 504 is rotated 90 degrees from that shown in FIG. 5 with respect to the auxiliary antenna 502. Each patch antenna element 506 is square or has a square shape to provide circular polarization. The multiple patch antenna array 504 provides circular polarization. The auxiliary antenna 502 is spaced about one wavelength from a center 510 of the multiple patch antenna array 504 to prevent electromagnetic coupling between the auxiliary antenna 502 and the multiple patch antenna array 506.

Figure 6:
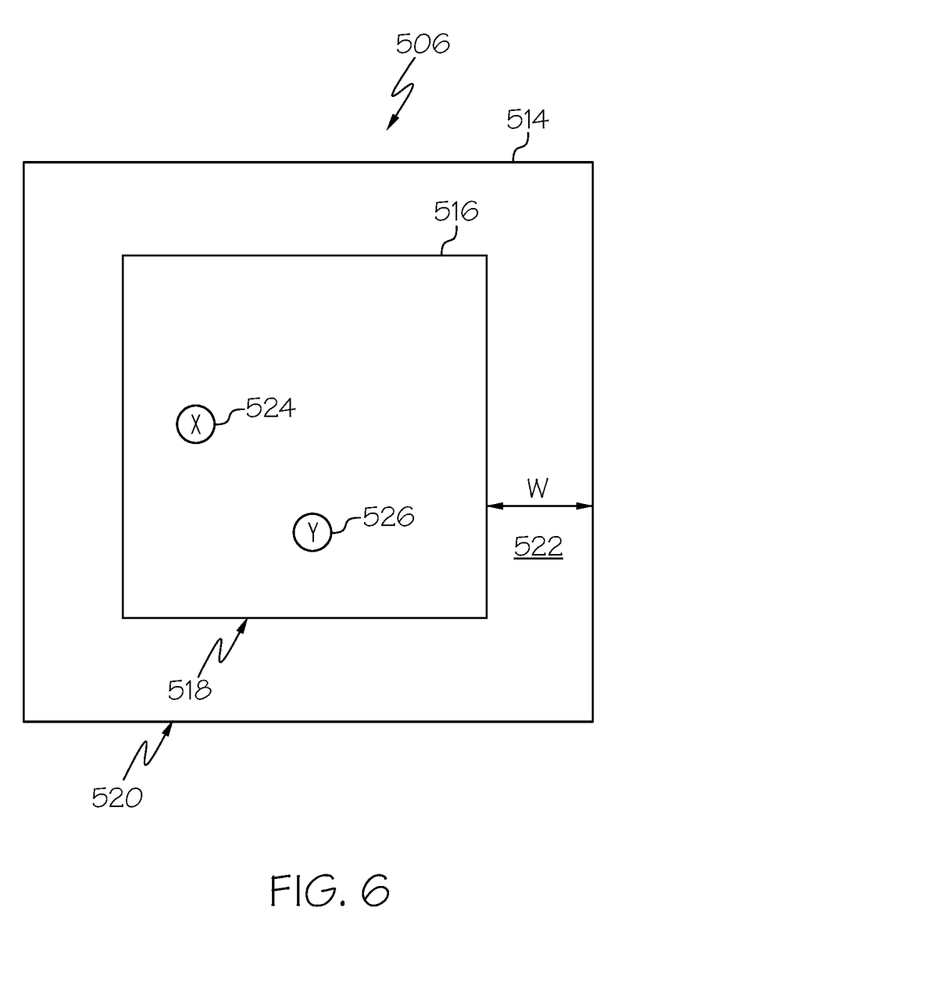
FIG. 6 is a detailed top view of a patch antenna element of the multiple patch antenna array in FIG. 3 in accordance with an embodiment of the present disclosure.

In accordance with an embodiment, the multiple patch antenna array 504 is formed on a ground plane 512. The ground plane 512 is an electrically conductive material or semiconductor material. Referring also to FIG. 6, FIG. 6 is a detailed top view of a patch antenna element 506 of the multiple patch antenna array 504 in FIG. 5 in accordance with an embodiment of the present disclosure. Each patch antenna element 506 includes a sheet 514 of dielectric material that is disposed on the ground plane 512. Each sheet 514 of dielectric material is square shaped. Each patch antenna element 506 also includes a patch 516 of electrically conductive material or semiconductor material disposed on the sheet 514 of dielectric material. Each patch 516 is square shaped. A side 518 of each patch 516 is shorter than a side 520 of each sheet 514 of dielectric material and each patch 516 is disposed concentrically on an associated sheet 514 of dielectric material. Accordingly, the sheet 514 of dielectric material defines a border 522 that has an equal width "W" about a perimeter of the patch antenna element 506. Each patch antenna element 506 also includes an X-direction feed 524 and a Y-direction feed 526 formed in the patch 516 to provide circular polarization of any RF signals transmitted by the patch antenna element 506.

Figure 7:
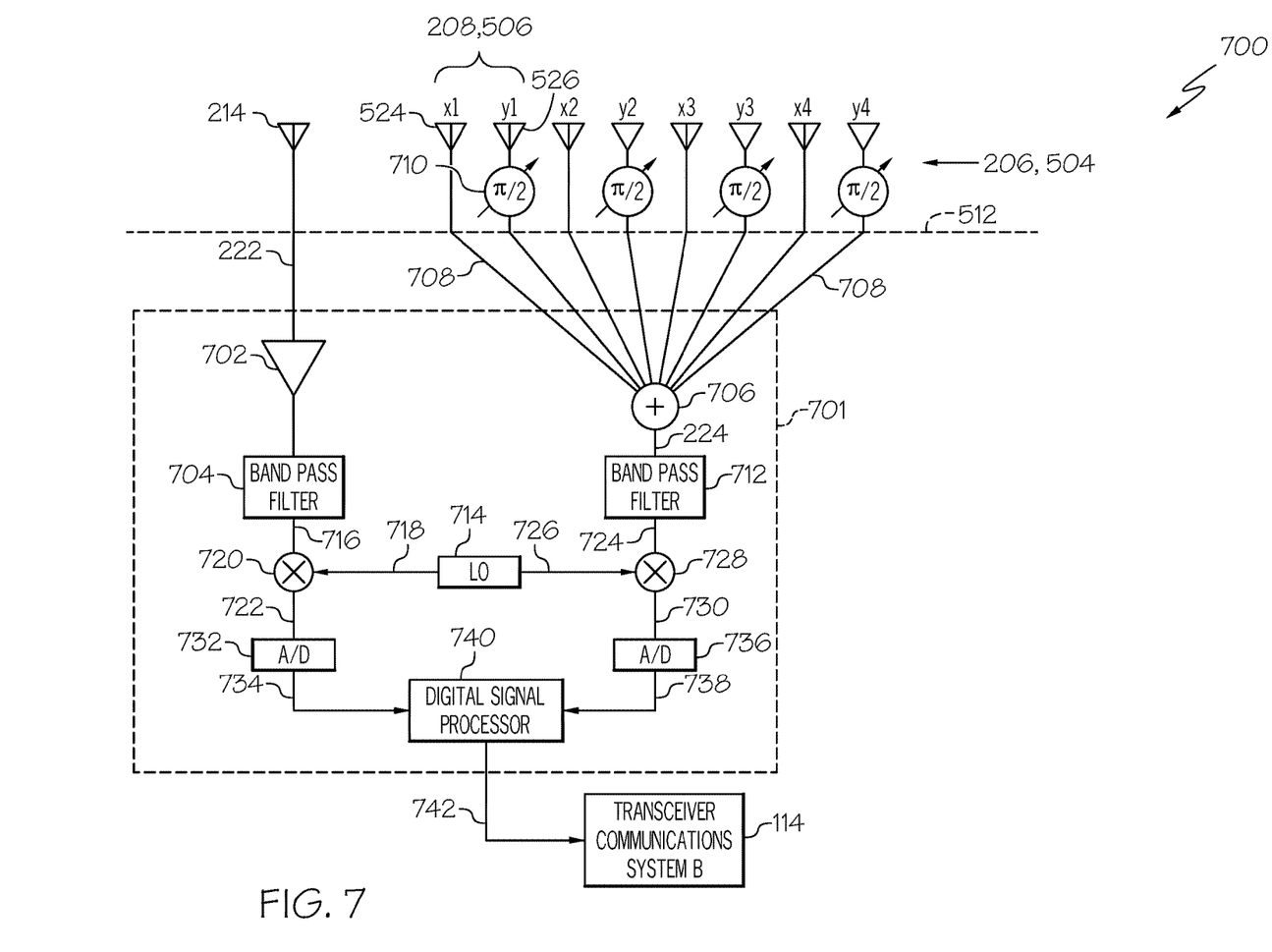
FIG. 7 is a block schematic diagram of an example of a system for mitigating interference from an adjacent antenna in accordance with an embodiment of the present disclosure.

FIG. 7 is a block schematic diagram of an example of a system 700 for mitigating interference from an adjacent antenna in accordance with an embodiment of the present disclosure. In accordance with an embodiment, the system 700 is used for the system 202 in FIG. 2. The system 700 includes a device 701 for generating a spatial null in accordance with an embodiment of the present disclosure. The device 701 is used for the device 216 in FIG. 2. The first signal 222 from the auxiliary antenna 214 is amplified by an amplifier 702 to a predetermined amplitude to cancel the RF transmission signals 210 in the direction 220 of the interfering antenna 102 from the multiple patch antenna array 206 without decreasing an amplitude of an electromagnetic radiation pattern 400, 404 of the multiple patch antenna array 206 in other directions from the multiple patch antenna array 206. The device 701 further includes a first band pass filter 704 that receives the first signal 222 from the auxiliary antenna 214. A summing junction 706 combines a signal 708 from each of the patch antenna elements 208 of the multiple patch antenna array 206 to form the second signal 224. As previously described, each patch antenna element 208 includes an X-direction feed 524 and Y-direction feed 526. A phase shifter 710 shifts the signal from each Y-direction feed 526 by 90 degrees. A second band pass filter 712 receives the second signal 224 from the multiple patch antenna array 206. Similar to that described with reference to FIG. 5, the multiple patch antenna array 206 is formed or mounted on a ground plane 512 and the auxiliary antenna 214 is also mounted on and extends from the ground plane 512.

The device 701 also includes a local oscillator 714. A first output signal 716 from the first band pass filter 704 is mixed with a reference signal 718 from the local oscillator 714 in a mixer 720 to provide a first mixed signal 722. A second output signal 724 from the second band pass filter 712 is mixed with another reference signal 726 from the local oscillator 714 in another mixer 728 to provide a second mixed signal 730. A first analog-to-digital converter (ADC) 732 samples or digitizes the first mixed signal 722 to produce a digitized first mixed signal 734 and a second ADC 736 digitizes the second mixed signal 730 to produce a digitized second mixed signal 738. A digital signal processor 740 combines the digitized first mixed signal 734 and the digitized second mixed signal 738 to provide the spatial null 214 in the direction 220 of the interfering antenna 102 (FIG. 2) from the multiple patch antenna array 206. An output 742 from the digital signal processor 740 is feed to the second transceiver 114. Accordingly, the digital signal processor 740 combines the digitized first signal 222 from the auxiliary antenna 214 or monopole antenna and the digitized combined second signal 224 from the multiple patch antenna array 206 to provide the spatial null 214 in the direction 220 of the interfering antenna 102 from the multiple patch antenna array 206. This is done by implementing a cancellation equation:

$$S_{tot} = Ae^{j\phi} * S_{mono} + S_{array}$$

Where $S_{mono}$ (S-sub-mono) and $S_{array}$ (S-sub-array) designate the signals from the respective antennas and A and $\phi$ are the amplitude adjustment and phase factor adjustment applied to the first signal 222 or $S_{mono}$ to provide cancellation similar to that previously described with reference to FIG. 3. $S_{tot}$ (S-sub-tot) designates the net signal after cancellation is applied. In accordance with an embodiment, the amplitude adjustment and phase factor adjustment are determined by a calibration procedure using an interference source in the direction of the interfering antenna 102 from the multiple patch antenna array 206. In accordance with an example where the second satellite communications system 116 is the Iridium satellite communications system, the output 742 from the digital signal processor 740 will be in the Iridium signal format. However, the cancellation equation and procedure described herein is applicable to any victim/interfering antenna pair.

Figure 8:
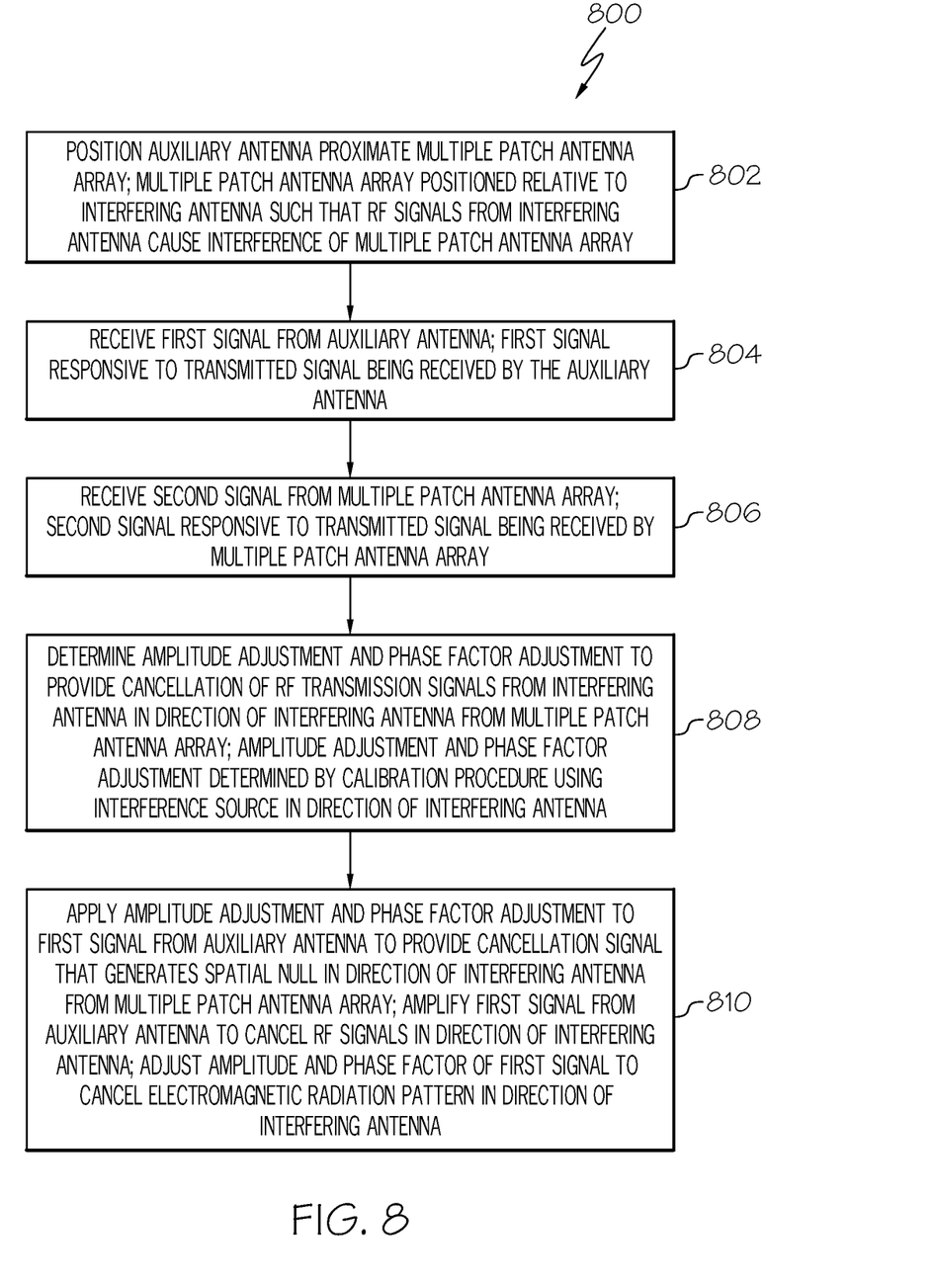
FIG. 8 is a flow chart of an example of a method for mitigating interference from an adjacent antenna in accordance with an embodiment of the present disclosure.

FIG. 8 is a flow chart of an example of a method 800 for mitigating interference from an adjacent antenna in accordance with an embodiment of the present disclosure. In block 802, a multiple patch antenna array is positioned relative to an interfering antenna such that RF signals from the interfering antenna cause interference with receiving signals by the multiple patch antenna array. An auxiliary antenna is positioned proximate a multiple patch antenna array and between the multiple patch antenna and the interfering antenna for generating a spatial null in a direction of the interfering antenna from the multiple patch antenna array. In accordance with an embodiment, the auxiliary antenna is a monopole antenna positioned at least about one wavelength from a center point of the multiple patch antenna array to avoid any electromagnetic coupling between the auxiliary antenna or monopole antenna and the multiple patch antenna array.

In block 804, a first signal is received from the auxiliary antenna or monopole antenna. The first signal is responsive to a transmitted signal being received by the auxiliary antenna. The transmitted signal may be transmitted by the interfering antenna or by another RF source.

In block 806, a second signal is received from the multiple patch antenna array. The multiple patch antenna array includes a multiplicity of patch antenna elements. The second signal is responsive to a transmitted signal being received by the multiple patch antenna array. The first signal and the second signal are received by a device to generate a spatial null in a direction to the interfering antenna from the multiple patch antenna array.

In block 808, an amplitude adjustment and a phase factor adjustment are determined to provide cancellation of the RF transmission signals from the interfering antenna in the direction of the interfering antenna from the multiple patch antenna array. In accordance with an embodiment, the amplitude adjustment and phase factor adjustment are determined by a calibration procedure using an interference source in the direction of the interfering antenna from the multiple patch antenna array.

In block 810, the amplitude adjustment and the phase factor adjustment are applied to the first signal from the auxiliary antenna to provide a cancellation signal that generates the spatial null in the direction of the interfering antenna from the multiple patch antenna array. The spatial null is generated in the direction to the interfering antenna from the multiple patch antenna array in response to the first signal and the second signal. The first signal and the second signal are generated in response to the transmitted signal being received by the auxiliary antenna and the multiple patch antenna array. The first signal from the auxiliary antenna is amplified to a predetermined amplitude to cancel the RF transmission signals in the direction of the interfering antenna without decreasing an amplitude of an electromagnetic radiation pattern of the multiple patch antenna array in other directions from the multiple patch antenna array. The amplitude and phase factor of the first signal or signal from the auxiliary antenna are adjusted to cancel electromagnetic radiation in the direction of the interfering antenna from the multiple patch antenna array thus creating the spatial null in the electromagnetic radiation pattern of the multiple patch antenna array and auxiliary antenna combination similar to that previously described with reference to FIGS. 4A and 4B. The spatial null permits simultaneous operation of the multiple patch antenna array and the interfering antenna.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A system for mitigating radio frequency "RF" interference from an adjacent antenna, comprising:
    a multiple patch antenna array comprising a multiplicity of patch antenna elements, the multiple patch antenna array being positioned relative to an interfering antenna such that RF transmission signals from the interfering antenna cause interference with receiving RF signals by the multiple patch antenna array;
    an auxiliary antenna positioned relative to the multiple patch antenna array to generate a spatial null in a direction of the interfering antenna from the multiple patch antenna array, wherein the auxiliary antenna comprises a monopole antenna and a height of the monopole antenna is selected so that a response of the monopole antenna to a radiated electromagnetic field from the interfering antenna approximately matches a response of the multiple patch antenna array to the radiated electromagnetic field of the interfering antenna; and
    a device to generate the spatial null to the interfering antenna from the multiple patch antenna array in response to a first signal from the auxiliary antenna and a second signal from the multiple patch antenna array, the first signal and the second signal being generated in response to the RF transmission signals being received by the auxiliary antenna and the multiple patch antenna array, wherein the spatial null permits simultaneous operation of the multiple patch antenna array and the interfering antenna.

2. The system of claim 1, wherein the device is configured to determine an amplitude adjustment and a phase factor adjustment to provide cancellation of the RF transmission signals from the interfering antenna in the direction of the interfering antenna from the multiple patch antenna array.

3. The system of claim 2, wherein the amplitude adjustment and the phase factor adjustment are applied to the first signal from the auxiliary antenna to provide a cancellation signal that generates the spatial null in the direction of the interfering antenna from the multiple patch antenna array.

4. The system of claim 3, wherein the first signal from the auxiliary antenna is amplified to a predetermined amplitude to cancel the RF transmission signals in the direction of the interfering antenna from the multiple patch antenna array without decreasing an amplitude of an electromagnetic radiation pattern of the multiple patch antenna array in other directions from the multiple patch antenna array.

5. The system of claim 1, wherein the monopole antenna is positioned about one wavelength from a center of the multiple patch antenna array.

6. The system of claim 1, wherein the multiple patch antenna array comprises at least two patch antenna elements.

7. The system of claim 1, wherein the multiple patch antenna array comprises four patch antenna elements.

8. The system of claim 7, wherein the patch antenna elements are positioned linearly to one another and the auxiliary antenna.

9. The system of claim 1, wherein each patch antenna element is square and the multiple patch antenna array provides circular polarization.

10. The system of claim 1, wherein the device to generate the spatial null comprises:
a first band pass filter that receives the first signal from the auxiliary antenna;
a summing junction to combine a signal from each of the patch antenna elements of the multiple patch antenna array to form the second signal;
a second band pass filter that receives the second signal from the summing junction;
a local oscillator, wherein a first output signal from the first band pass filter is mixed with a reference signal from the local oscillator to provide a first mixed signal and a second output signal from the second band pass filter is mixed with another reference signal from the local oscillator to provide a second mixed signal;
a first analog-to-digital converter "ADC" to digitize the first mixed signal;
a second ADC to digitize the second mixed signal; and
a digital signal processor that combines the digitized first mixed signal and the digitized second mixed signal to provide the spatial null in the direction of the interfering antenna from the multiple patch antenna array.

11. The system of claim 1, wherein the interfering antenna transmits the RF transmission signals in a first frequency band and the multiple patch antenna array transmits and receives other RF transmission signals in a second frequency band adjacent the first frequency band without a guard band between the first frequency band and the second frequency band.

12. A system for mitigating radio frequency "RF" interference from an adjacent antenna comprising:
a first transceiver onboard a vehicle, the first transceiver being configured for transmitting and receiving RF signals over a first communications system operating in a first frequency band;
an interfering antenna coupled to the first transceiver for transmitting and receiving the RF signals;
a second transceiver onboard the vehicle, the second transceiver being configured for transmitting and receiving RF signals over a second communications system operating in a second frequency band adjacent the first frequency band without a guard frequency between the first frequency band and the second frequency band;
a multiple patch antenna array coupled to the second transceiver, the multiple patch antenna array comprising a multiplicity of patch antenna elements, the multiple patch antenna array being positioned proximate to the interfering antenna such that RF transmission signals from the interfering antenna cause interference with receiving the RF signals by the multiple patch antenna array;
an auxiliary antenna positioned between the multiple patch antenna array and the interfering antenna and proximate to the multiple patch antenna array, wherein the auxiliary antenna comprises a monopole antenna and a height of the monopole antenna is selected so that a response of the monopole antenna to a radiated electromagnetic field from the interfering antenna approximately matches a response of the multiple patch antenna array to the radiated electromagnetic field of the interfering antenna; and
a device to generate a spatial null in a direction to the interfering antenna from the multiple patch antenna array in response to a first signal from the auxiliary antenna and a second signal from the multiple patch antenna array, the first signal and the second signal being generated in response to the RF transmission signals transmitted by the interfering antenna being received by the auxiliary antenna and the multiple patch antenna array, wherein the spatial null permits simultaneous operation of the multiple patch antenna array and the interfering antenna.

13. The system of claim 12, wherein the device is configured to determine an amplitude adjustment and a phase factor adjustment to provide cancellation of the RF transmission signals from the interfering antenna in the direction of the interfering antenna from the multiple patch antenna array, the amplitude adjustment and the phase factor adjustment are applied to the first signal from the auxiliary antenna to provide a cancellation signal that generates the spatial null in the direction of the interfering antenna from the multiple patch antenna array.

14. A method for mitigating radio frequency (RF) interference from an adjacent antenna, comprising:
receiving a first signal from an auxiliary antenna;
receiving a second signal from a multiple patch antenna array, the multiple patch antenna array comprising a multiplicity of patch antenna elements, the multiple patch antenna array being positioned relative to an interfering antenna such that RF transmission signals from the interfering antenna cause interference with receiving RF signals by the multiple patch antenna array, wherein the auxiliary antenna comprises a monopole antenna and a height of the monopole antenna is selected so that a response of the monopole antenna to a radiated electromagnetic field from the interfering antenna approximately matches a response of the multiple patch antenna array to the radiated electromagnetic field of the interfering antenna; and
generating a spatial null to the interfering antenna from the multiple patch antenna array in response to the first signal and the second signal, the first signal and the second signal being generated in response to the RF transmission signals being received by the auxiliary antenna and the multiple patch antenna array, wherein the spatial null permits simultaneous operation of the multiple patch antenna array and the interfering antenna.

15. The method of claim 14, further comprising:
determining an amplitude adjustment and a phase factor adjustment to provide cancellation of the RF transmission signals from the interfering antenna in the direction of the interfering antenna from the multiple patch antenna array; and applying the amplitude adjustment and the phase factor adjustment to the first signal from the auxiliary antenna to provide a cancellation signal that generates the spatial null in the direction of the interfering antenna from the multiple patch antenna array.

16. The method of claim 15, amplifying the first signal from the auxiliary antenna to a predetermined amplitude to cancel the RF transmission signals in the direction of the interfering antenna without decreasing an amplitude of an electromagnetic radiation pattern of the multiple patch antenna array in other directions from the multiple patch antenna array.

17. The system of claim 1, further comprising:
a first transceiver configured for transmitting and receiving RF signals over a first communications system operating in a first frequency band, wherein the interfering antenna is coupled to the first transceiver for transmitting and receiving the RF signals; and
a second transceiver configured for transmitting and receiving RF signals over a second communications system operating in a second frequency band adjacent the first frequency band without a guard frequency between the first frequency band and the second frequency band, wherein the multiple patch antenna array is coupled to the second transceiver.

18. A system for mitigating radio frequency "RF" interference from an adjacent antenna, comprising:
a multiple patch antenna array comprising a multiplicity of patch antenna elements, the multiple patch antenna array being positioned relative to an interfering antenna such that RF transmission signals from the interfering antenna cause interference with receiving RF signals by the multiple patch antenna array;
an auxiliary antenna positioned relative to the multiple patch antenna array, wherein the auxiliary antenna is positioned at least about one wavelength from a center of the multiple patch antenna array, wherein the auxiliary antenna comprises a monopole antenna and a height of the monopole antenna is selected so that a response of the monopole antenna to a radiated electromagnetic field from the interfering antenna approximately matches a response of the multiple patch antenna array to the radiated electromagnetic field of the interfering antenna; and
a device to generate a spatial null in a direction to the interfering antenna from the multiple patch antenna array in response to a first signal from the auxiliary antenna and a second signal from the multiple patch antenna array, the first signal and the second signal being generated in response to the RF transmission signals being received by the auxiliary antenna and the multiple patch antenna array, wherein the spatial null permits simultaneous operation of the multiple patch antenna array and the interfering antenna.

19. The system of claim 18, wherein the auxiliary antenna comprises a gain lower than a gain of the multiple patch antenna array.

20. The system of claim 18, wherein the device is configured to determine an amplitude adjustment and a phase factor adjustment to provide cancellation of the RF transmission signals from the interfering antenna in the direction of the interfering antenna from the multiple patch antenna array.

21. The system of claim 20, wherein the amplitude adjustment and the phase factor adjustment are applied to the first signal from the auxiliary antenna to provide a cancellation signal that generates the spatial null in the direction of the interfering antenna from the multiple patch antenna array.

22. The system of claim 18, wherein the multiple patch antenna array comprises at least two patch antenna elements.

23. The system of claim 18, wherein the multiple patch antenna array comprises four patch antenna elements.

24. The system of claim 18, wherein the interfering antenna transmits the RF transmission signals in a first frequency band and the multiple patch antenna array transmits and receives other RF transmission signals in a second frequency band adjacent the first frequency band without a guard band between the first frequency band and the second frequency band.

* * * * *

UNITED STATES PATENT AND TRADEMARK OFFICE
CERTIFICATE OF CORRECTION

PATENT NO.        : 11,011,836 B2
APPLICATION NO.   : 15/384954
DATED             : May 18, 2021
INVENTOR(S)       : Jeffrey D. Postetter et al.

Page 1 of 1

It is certified that error appears in the above-identified patent and that said Letters Patent is hereby corrected as shown below:

In the Claims

In Column 12, Line 44, after "spatial null" insert -- in the direction --, therefor.

In Column 14, Line 52, after "spatial null" insert -- in the direction --, therefor.

Signed and Sealed this
Fifth Day of October, 2021

Drew Hirshfeld
*Performing the Functions and Duties of the
Under Secretary of Commerce for Intellectual Property and
Director of the United States Patent and Trademark Office*